(No Model.)

H. GOTTHEIMER.
APPARATUS FOR CHECKING AND CONTROLLING HORSES.

No. 289,406. Patented Dec. 4, 1883.

Witnesses:
Chas. P. Gilson
Wm. H. Bryan

Inventor:
Henry Gottheimer

UNITED STATES PATENT OFFICE.

HENRY GOTTHEIMER, OF BROOKLYN, NEW YORK.

APPARATUS FOR CHECKING AND CONTROLLING HORSES.

SPECIFICATION forming part of Letters Patent No. 289,406, dated December 4, 1883.

Application filed August 13, 1883. (No model.)

*To all whom it may concern:*

Be it known that I, HENRY GOTTHEIMER, a citizen of the United States, residing in the city of Brooklyn, county of Kings, and State of New York, have invented a new and useful Appliance for Checking Horses or Animals when Attached to Vehicles, of which the following is a specification.

Figure 1:
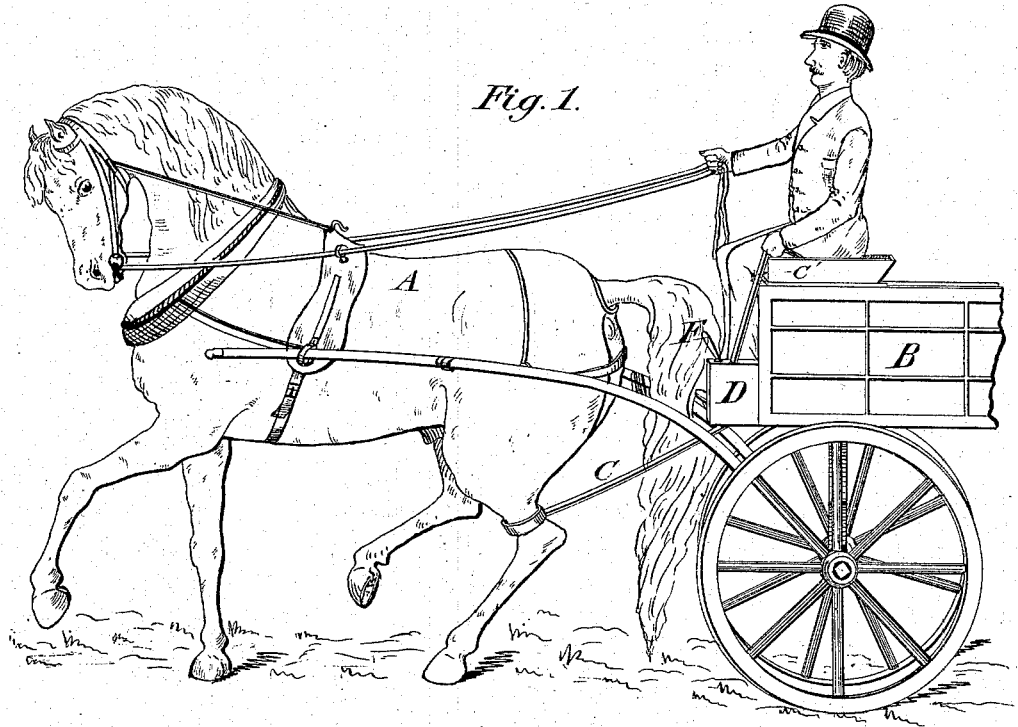

My invention relates to an improved appliance for checking horses or animals when attached to vehicles; and its object is to prevent them running away, as well as to compel them to stand without tying. I attain these objects by the arrangement of mechanism herein described, and illustrated in the accompanying drawings, forming part of this specification, viz:

Figure 1 represents the horse, vehicle, and general arrangement of my appliance for the purpose herein set forth. A represents the horse. B is the vehicle. C is a strap attached, as shown, above the middle joint, to the hinder leg of the animal. D is a box, which I designate as a "check-box." It is firmly attached to the vehicle by a clamp, E. Through this box the strap C passes, the portion beyond the box being indicated by C' to within convenient distance of the driver. F is a hand-lever, which is used to effect the restoration of the parts to their normal position, after being used, by depressing a spring, as hereinafter shown and described.

Figure 2:
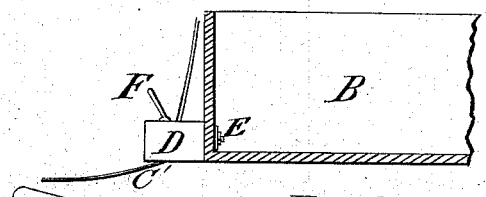

Fig. 2 shows the front portion of the vehicle B enlarged, showing check-box D, clamp E, lever F, and a portion of the strap C.

Figure 3:
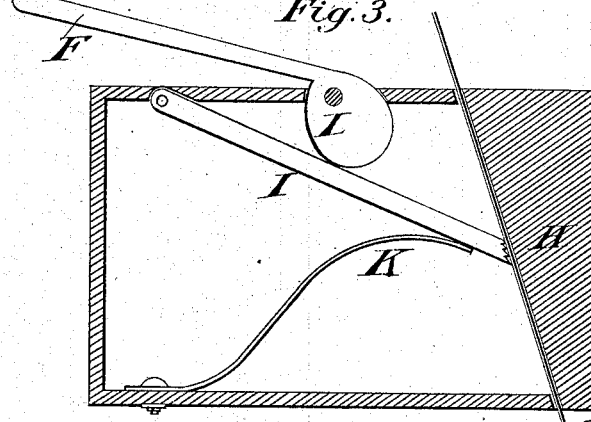

Fig. 3 shows a transverse sectional view of the check-box, showing its internal construction. H is a frame or holder of the mechanism. I is a toothed lever moving on a pivot. K is a spring pressing against the lever normally. L is a pressure-block, which can be turned by the handle or lever F to remove the pressure of the spring from the lever that is toothed. C is the strap.

The arrangement herein shown allows the strap to be pulled easily in one direction, but holds it fast against any motion in the other.

By using the handle-lever F the pressure of the spring on the toothed lever which holds the strap is removed, and the strap can be readily returned to its original position.

The operation of this device is as follows: The animal being harnessed to the vehicle, the strap C is attached, as shown, above the middle joint of either hind leg of the animal, and passing through the check-box D and its mechanism, continues to within easy reach of the driver. The strap C is left sufficiently slack between the check-box D and the limb of the animal to permit ordinary movements of the animal's limbs. The mechanism of the check-box D, as shown, allows the strap to be pulled away from the animal, but prevents its return. Hence, if the animal be unruly, or it be desirable to cause him to stand without tying, the strap is pulled through the check-box away from the animal until no slack strap remains, and the limb of the animal to which the strap is attached is hobbled by the handle-lever F. The clutch on the strap of the mechanism is released, and it is readily pulled back to its normal position.

Having now described my invention, what I claim, and desire to secure by Letters Patent, is—

1. An apparatus for checking horses, consisting of a strap adapted to be attached to the leg of a horse, and a box containing a clamping device to adjustably secure the strap, the box being adapted to be secured to a vehicle, all substantially as described, and for the purpose set forth.

2. The combination of a box, D, adapted to be secured to a vehicle, having a wedge-shaped portion, H, and suitable openings for the admission of a strap, a lever, I, a spring, K, and a hand-lever, F, having a cam, L, with a strap, C, all substantially as described, and for the purpose set forth.

HENRY GOTTHEIMER.

Witnesses:
JOHN M. STEARNS,
GEO. W. GREEN.